March 3, 1959
C. C. BUCKELS
2,875,915
MULTIPLE POSITION OUTLET BOX
Filed Feb. 11, 1957
2 Sheets-Sheet 1
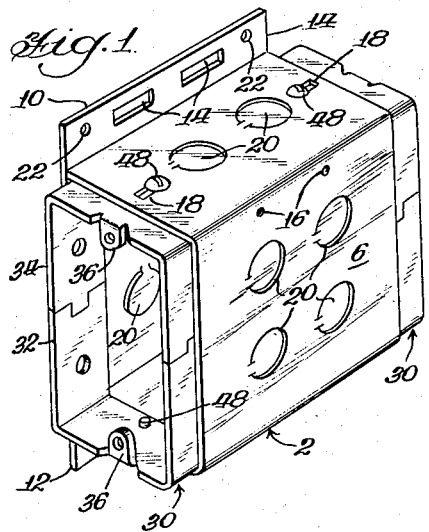
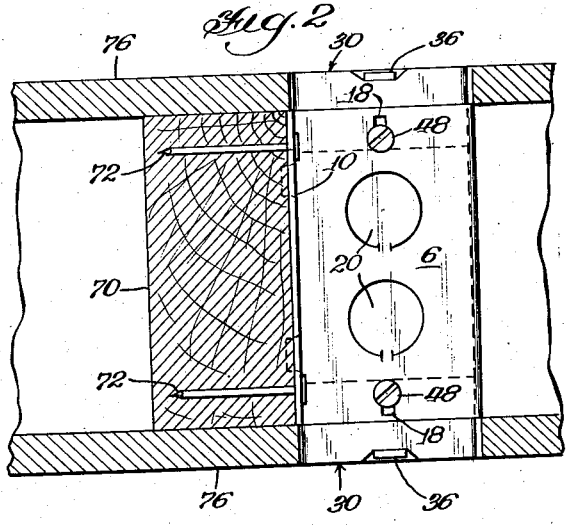
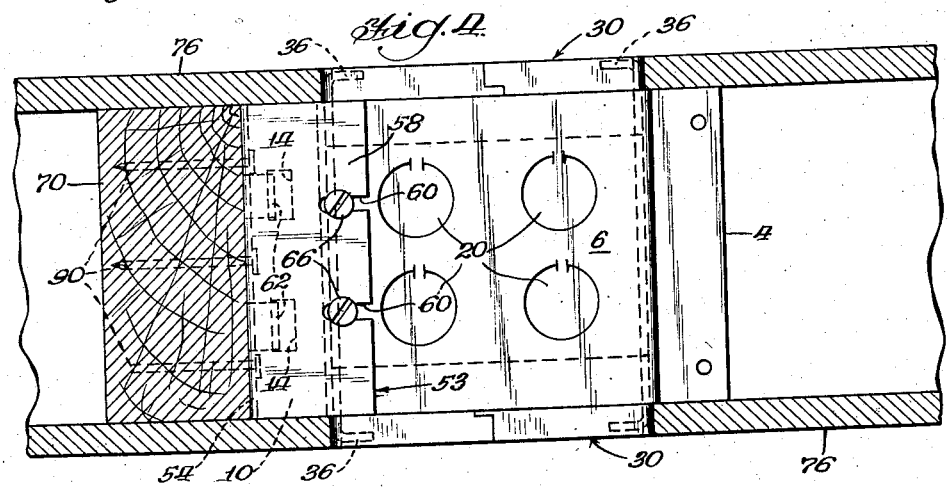
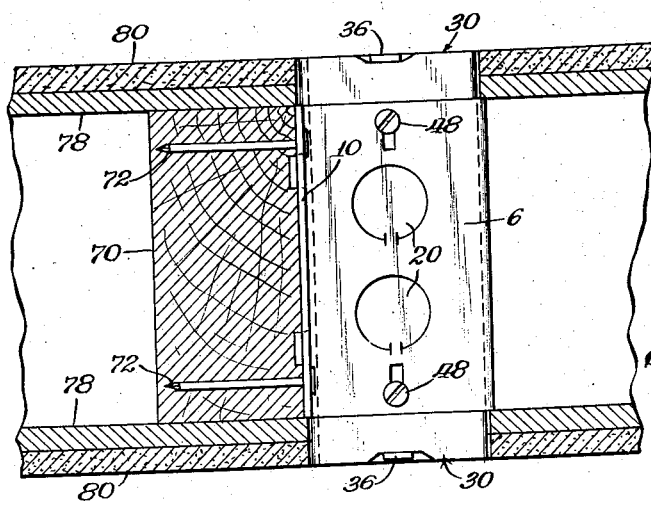
INVENTOR.
Christopher C. Buckels
BY
Attÿ.

March 3, 1959
C. C. BUCKELS
2,875,915
MULTIPLE POSITION OUTLET BOX
Filed Feb. 11, 1957
2 Sheets-Sheet 2
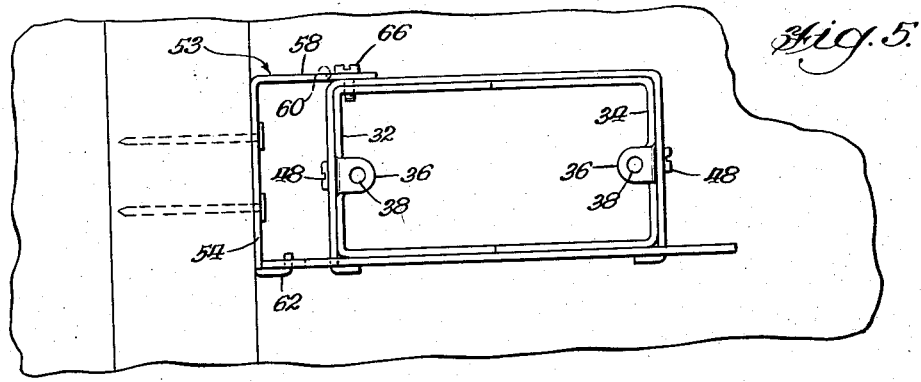
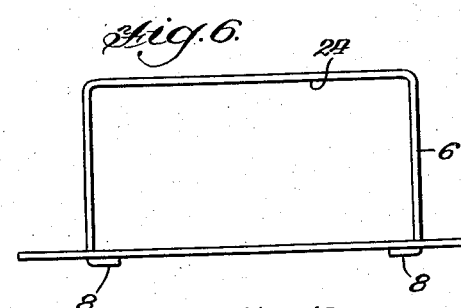
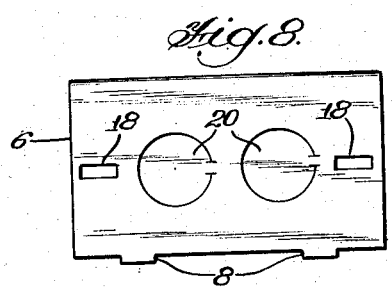
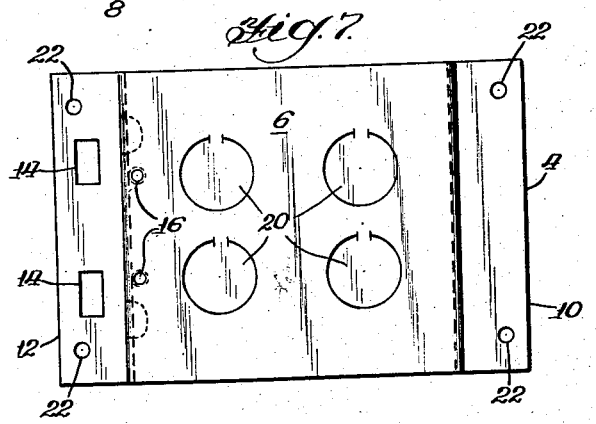
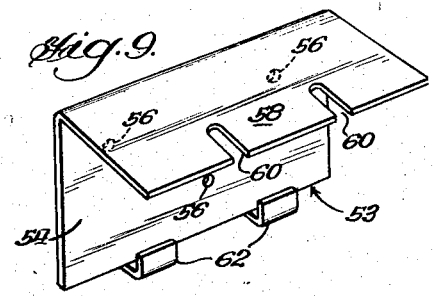
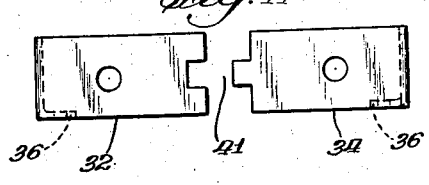
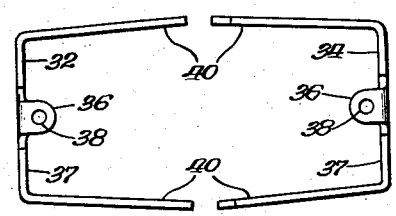
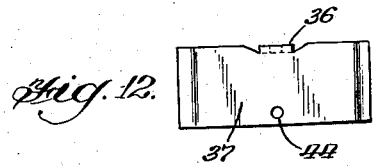
INVENTOR.
Christopher C. Buckels
BY
Atty.

United States Patent Office 2,875,915
Patented Mar. 3, 1959

2,875,915

MULTIPLE POSITION OUTLET BOX

Christopher C. Buckels, Chicago, Ill.

Application February 11, 1957, Serial No. 639,321

5 Claims. (Cl. 220—3.7)

The invention relates to a multiple position electrical outlet box of particular utility for use in conjunction with modern construction techniques.

Those familiar with the construction art have appreciated that certain fundamental changes in type of construction have been extensively developed and are developing in the post World War II period. For many years conventional construction employed studding, lath and plaster to define the interior walls of homes and other buildings. In very many areas in the country today this conventional construction is still utilized, especially in those urban areas where building codes so require. However, in an effort to minimize rising costs and keep building construction within economical reason, a substantial rise in the use of dry wall covering has been undertaken. Another reason for this change is, of course, improved technology in dry wall material which has resulted in commercially acceptable construction.

It will also be understood by those skilled in the art that conventional construction methods require that the electrical contractor complete his rough electrical installation shortly after wall studding and the like is installed in the building and before wall enclosure with dry wall cover or lath and plaster. This preliminary electrical installation consists usually of appropriately located outlet boxes, conduits interconnecting the boxes and, perhaps, appropriate service entrance equipment. After the wall enclosure operation, that is after the installation of the dry wall cover or the lath and plaster the electrical contractor undertakes the final wiring operation wherein wires, switches, outlets and the like are installed and final hook-up can then be accomplished.

The mentioned variety of construction techniques, that is, the presence of both dry wall and more conventional lath and plaster construction has presented most electrical contractors with a problem from a standpoint of available fittings. In the usual case fittings such as for example, certain outlet boxes cannot be alternately adapted to both dry wall and conventional lath and plaster construction. Indeed, in many cases a designed fitting is not available on the market for a particular problem encountered in a particular type of construction. When this situation occurs make shift and unsatisfactory practices must be indulged in.

To reduce rising construction costs, efforts are being made to simplify electrical systems utilized in currently constructed buildings. An example of this simplification has been the design and use of what is known in the trade as a "thruway" box. A box of this type is open at both ends and is of such dimension that it will extend entirely through an internal wall of a building and present on both faces of that wall an opening for an outlet or switch mounting. The practical result of this type of a box is that a pair of outlets in different rooms may be installed for the approximate cost in labor and material of a single outlet. Again, the varying types of construction has presented a problem to the electrical contractor because he has not been able to obtain fittings of this type that would accommodate both types of construction.

It will be readily appreciated that most outlet boxes are generally of rectangular form, that is, on axis thereof is considerable longer than the other axis thereof. It has been found that different contractors have different opinions as to whether it is preferable to maintain the box vertically or horizontally. In some instances the requirements of a particular job will dictate that all boxes be mounted one way or another. In other circumstances esthetic opinions of decor and the like will prompt a contractor to mount the boxes either vertically or horizontally. Suffice it to say, that these variations from job to job have presented problems from the standpoint of functional electrical fitting requirements.

Accordingly, it is a primary object of the invention to provide a novel multiple position outlet box that readily satisfies the demands of present day industry.

It is a further object of the invention to provide an electrical box of the "thruway" type which readily accommodates itself to varying types of construction, that is, dry wall or lath and plaster.

It is a further object of the invention to provide a "thruway" outlet box arrangement of the type described having novel features associated therewith that will enable the user to readily mount the box in either a horizontal or vertical position.

It is a further specific object of the invention to provide an outlet box of the type described of such structural arrangement that positive and firm stud mounting is assured in a plurality of selectable positions and further including features that assures positive and firm outlet or switch mounting in the box.

These and other objects of the invention will become apparent in the course of the following description and from an examination of the concerned drawings, wherein:

Figure 1 is a perspective view of a preferred embodiment of a box here under consideration, Figures 2, 3, and 4 are plan, sectional views illustrating the box of Figure 1 in a variety of mounted positions in the wall.

Figure 5 is a front end elevational view with the wall covering material broken away, of the box shown in Figure 4.

Figure 6, 7, and 8 are various views illustrating the central section of the box under consideration, Figure 9 is a perspective view of an auxiliary mounting flange associated with the box, and Figures 10, 11, and 12 are detail views of a telescoping member portion of the box.

Describing the invention in detail and directing attention to the figures, it will be seen that the box comprises a central section, indicated generally at 2, which in turn is composed of a base or mounting plate 4 and upstanding therefrom a rectangular box defining member 6. The member 6 may be secured to the plate 4 in any conventional manner, as for example, by means of integral lugs 8, 8 projected downwardly through complementary receiving slots in the base 4 whereat they may be bent into overlapping relation with the base to provide said mounting. It will also be noted that the base 4 is provided with flanges 10 and 12 which extend outwardly beyond the limits of the member 6 as seen in plan view.

The flange 10 is preferably provided with one or more slots or apertures 14, 14, best seen in Figures 1 and 7. The member 6 may be provided with one or more tapped holes 16, 16 preferably located on the side thereof remote from the base 4. Further, the member 6 may be provided with slots 18, 18 located adjacent opposite edges thereof and on opposed sides thereof. A plurality of knock out openings 20, 20 may be placed in any convenient locations on the member 6 and base 4. The flanges 10 and 12 further present holes or apertures 22 which serve as convenient means for nailing said flanges to a mounting stud as will hereinafter be explained in detail.

Directing attention to Figures 6 through 8, it will be seen that the base 4 and the member 6 define a generally rectangular box having openings at opposite ends thereof. In short, a passageway 24 extending entirely through the box 2 is defined.

Adjacent each end of the passageway 24 a movable member, indicated generally at 30, is positioned. Directing attention to Figures 10, 11, and 12, it will be seen that each movable member 30 may comprise a pair of U-shaped elements 32 and 34. Centrally of a base 37 of each U-shaped element a mounting lug 36 is bent inwardly and is provided with a tapped aperture 38 therein. Upstanding legs 40, 40 of each U-shaped are arranged in obtuse angular relation to the related base 37. Additionally, the extremities of the upstanding legs 40 are formed in complementary lug and slot formation 41 so that when the elements 32 and 34 are assembled they define the hollow substantially rectangular member 30. It will be particularly noted that the forming of each member 30 into separate elements 32 and 34 having legs 40 in obtuse angular relationship with the respective base 37 results in a light outward spring-like bowing of the central portions of each member 30, the functions of which will hereinafter be explained in detail. In addition to the above, each base 37 of the U-shaped elements 32 and 34 are provided with tapped holes 44.

Returning to the Figure 1, it will be seen that each movable member 30 is assembled and telescopically received in the passageway 24 of the box 2 and adjacent opposite ends thereof. In this manner the tapped holes 44 of each movable member 30 are located immediately adjacent the slots 18 formed in the member 6. Guiding and locking screws 48, 48, extend through the slots 18 and threadably engage the tapped holes 44 in each member 30 whereby the members 30 and the central section of the box are in movable pin and slot engagement with each other. The spring-like bow formed centrally of the members 30 causes each member 30 to frictionally engage the internal periphery of passageway 24 to aid in the firm, but movable mounting therein. The cooperative relationship between the screws 44 and the slots 18 enables the members 30 to be moved longitudinally of the passageway 24 to increase or decrease the overall length of the box. In short, the box may be varied in length between certain minimum and maximum lengths determined by the lengths of the slots 18. After positioning the movable elements 30 at the locations for desired box length, the screws 44 may be tightened to positively lock same in determined position.

Directing attention to Figure 9, it will be seen that a mounting plate, indicated generally at 53, is shown having a base wall 54 with a plurality of nail holes 56 located therein. A flange 58 is integrally and perpendicularly arranged from one edge of the base wall 54, said flange having one or more edge slots 60, 60 formed therein. The opposite edge of the base wall 54 may be provided with one or more projected hook-like lugs 62 extending therefrom. In the preferred embodiment of the invention the lugs 62 are arranged to be complementally received in the apertures 14 formed in the flange 10 of the base wall 4. The slots 60, on the other hand, complementally rest above the tapped holes 16 formed in the members 6 when the mounting element is assembled to the box 2. As is best seen in Figures 4 and 5, the screws 66 are threadably received in the tapped holes 16 and complementally received in the edge slots 60 of the mounting member 53. The box may therefore be securely affixed to the mounting member by merely engaging the lugs 62 with the apertures 14 and frictionally securing the flange 58 to the box 2 by means of the screws 66.

Considering the use of the novel box, attention is first directed to Figures 2 to 4, wherein the box 2 is illustrated securely fixed in a vertical position to a stud 70 by means of nails 72 which are received in the nail holes 22 of the flanges 10 and 12. In the wall shown in Figure 2 the stud 70 has dry wall covering 76 mounted thereon. The telescoping members 30, 30 may be set and locked by screws 48 internally of the passageway 24 to provide a minimal overall box length. In this position the outer edge of the members 30 are substantially co-planar with the surface of the dry wall covering 76, whereby the switch mounting lugs 36 are properly located for subsequent switch or outlet installation. Considering Figure 3, it will be seen that the stud 70 is here covered with lath 78 and plaster 80. The box again is secured in a vertical position to the stud and in the same manner as heretofore mentioned. However, to insure alignment between the outer edges of the box 2 and the surface of the plaster 80 it will be seen that the screws 48 may be positioned and secured to the outboard extremities of the slots 18 thereby providing maximum box length and substantial co-planar alignment between the outer edges of the members 30 and the surface of the paster 80. Thus it will be seen that the outlet box here disclosed readily accommodates itself to walls of varying thickness, for example, walls either of dry wall or lath and plaster construction.

Considering Figures 4 and 5, it will be remembered that some installations require horizontal box mounting. In these circumstances, the mounting plate 53, shown in Figure 8, is first secured to the stud by means of nails 90 received in apertures 56 provided therein. The box with screws 66 loosely mounted in tapped holes 16 may then be mounted to the member 53 slipping the apertures 14 over the hooked lugs 62 and securing the flange 58 to the box 2 by tightening the screws 66 after reception in the edge slots 60. It has been found that this method of mounting provides the desired positive and firm horizontal positioning of the outlet box and further accurate horizontal mounting of same is achieved by merely aligning the vertical edges of the member 53 with the edges of the stud 70 to which it is nailed. It will readily be understood that horizontal mounting may be utilized on walls of any thickness, that is, either on dry walls or lath and plaster walls by merely properly positioning the movable members 30 for the particular type of construction and as above described.

Thus it will be seen that I have provided a novel multiple position "thruway" outlet box which is readily adapted for use in walls of varying thickness frequently encountered by the electrical contractor in modern construction. Further, the box arrangement is readily adaptable for either horizontal or vertical mounting as the requirements of a particular installation dictate. The arrangement provided thus not only offers the economic advantages of "thruway" type installations, but further simplifies the contractors installation problems because of its versatile features.

The invention as disclosed is by way of illustration and not limitation and may be modified without departing from the spirit thereof or the scope of the appened claims.

What is claimed is:

1. In an electrical outlet box, a base plate, a central member upstanding therefrom and defining with the plate a rectangular passageway extending through the box and having oppositely directed openings, said base plate comprising flanges extending outboardly of the central member and having apertures therein to receive nails to secure the box to a stud in a first position, one of said flanges having other apertures therein, screw means threadably connected to the central member, an alternate mounting element comprising a base wall having apertures therein to receive nails to secure the element to a stud, hook-like lugs extending from the base wall, and a second wall extending from the base wall and having edge slots in the extremity thereof remote from the base wall, said lugs being received in said other apertures and said edge slots receiving said screw means to accommodate securing of the box to the stud in a second position.

2. In an electrical outlet box, a base plate, a central member upstanding from the plate and defining therewith a rectangular passage extending through the box presenting oppositely directed openings, said base plate comprising flanges extending outwardly of the member and having apertures therein for receiving nails to secure the box to a stud, slots formed in the member adjacent opposed openings thereof, extensible and retractible elements of substantially rectangular form telescopically received in opposite ends of the passageway to selectively accommodate a variation in effective length of the box, screw means threadably received in the last mentioned elements and extending through the slots to limit extension and retraction of said elements and to provide means to lock same in selected positions in the passageway, an alternate mounting device comprising a base wall having apertures therein for receiving nails to secure the device to a stud, said device further comprising hook-like lugs extending from the base wall, a second wall extending outwardly from the base wall and having edge slots in the extremity thereof remote from the base wall, said central member having screw means threadably connected thereto, and one of said flanges having apertures to receive the hook-like lugs, said edge slots being arranged to receive said last mentioned screw means to accommodate firm mounting of the box to the alternate mounting device.

3. In an electrical outlet box, a plurality of walls defining a hollow box having oppositely directed openings, said box including at least one flange extending outwardly of the box and having apertures therein to receive means to secure the box to a wall stud in a first position, demountable means having apertures therein to secure the box to a wall stud in a second position, said means comprising a base plate, cooperating means on the base plate and box to firmly connect the box to the demountable means, said cooperating means comprising at least one hook on the base plate and at least one receiving aperture on the box therefor, and at least one screw on the box at least one receiving aperture on the base plate therefor.

4. An electrical outlet box according to claim 3, and including members telescopically received in said openings and movable therein to selectively alter the length of the box, and means to firmly secure the last mentioned members to the box.

5. An electrical outlet box according to claim 4, wherein said last mentioned means comprises slots in the box, and screws extending through the slots and threadably connected to the last mentioned members.

References Cited in the file of this patent

UNITED STATES PATENTS

| | | |
|---|---|---|
| 1,573,071 | Kaye | Feb. 16, 1926 |
| 1,725,293 | Morgenstern | Aug. 20, 1929 |
| 1,796,037 | Mangin | Mar. 10, 1931 |
| 1,875,101 | Morrell | Aug. 30, 1932 |
| 2,130,839 | Conners | Sept. 30, 1938 |
| 2,299,674 | Austin | Oct. 20, 1942 |
| 2,604,982 | Cibie | July 20, 1952 |